UNITED STATES PATENT OFFICE 2,462,760

PROTECTIVE COATINGS FOR FRESH FROZEN MEATS

Harold S. Mitchell, Chicago, Lorenz E. Kay, Worth, and Andrew S. Hartanov and John M. Ramsbottom, Chicago, Ill., assignors to Swift & Company, Chicago, Ill., a corporation of Illinois No Drawing. Application November 8, 1944, Serial No. 562,566

8 Claims. (Cl. 99—169)

This invention relates to protective coatings for fresh meats. It is now commercial practice to wrap boneless veal rolls, for example, with beef caul fat approximately ¼" thick and tied with a cord at uniformly spaced distances along the length of the roll. Thic caul fat, in sheet form, is applied to a freshly made roll and wrapped product is then frozen and the ends squared off.

The present invention contemplates the pre-chilling of rolls of meat, preferably to a frozen condition, and the subsequent application of a protective coating containing gelatin and oleo stock.

An object of the present invention is to provide an improved chilled or frozen meat product containing a protective coating and a method of producing the same.

In practice it has been determined that a protective coating comprising an emulsion of gelatin and oleo stock presents a problem of sticking to the roasting pan or frying pan during the cooking operation of the meat to which the coating is applied.

Another object of the invention is to provide an improved composition for coating meats which will not stick to the roasting or frying pan.

A further object of the invention is to provide an anti-sticking agent for a gelatin-fat-emulsion suitable as a coating composition for meats.

In carrying out the invention, we desirably employ an emulsion comprising about one part oleo stock to about one part of gelatin solution containing 20% gelatin. This results in a solution having about one part fat, plus .83 part of water, plus 0.17 part gelatin. However, a coating made with the aforesaid composition has an undesirable faculty of sticking to the roasting pan and frying pan. After considerable research, we have discovered that we may use about 46% gelatin solution, plus about 46% oleo solution, to which approximately 8% of white wheat flour is added. This white wheat flour serves as an emulsifying agent since it contains proteins and other substances, which in themselves serve as emulsifying agents. The emulsifying properties of flour are in part due to the fact it is a powder. When the protective coating breaks down during the cooking of the meat, we believe that the flour acts as a dispersing agent in the gelatin, thereby preventing a tacky mass of carbonized gelatin.

It has also been found that an emulsion containing about 48 parts of a 3% gelatin solution, 48 parts of No. 1 oleo stock, and 4 parts of wheat flour is highly efficient in use, and that the tendency of the coating to stick to cooking utensils was reduced to such an extent that such effects were insignificant.

While we have mentioned above wheat flour we are not restricted to the use of these specific materials. We have found other cereal and vegetable flours besides wheat flour to be useful. For example, rye flour, durum flour, oat flour and soy bean flour may be used. Thus, a flour made from a vegetable seed serves as an effective anti-sticking agent in the meat-coating composition to prevent the formation of a tacky mass of carbonized gelatin during the cooking of the meat. Also we have found that wheat gluten is substantially as effective as wheat flour and that soy bean protein may be used. Mixtures of one or more of any of the foregoing material may be used.

The pre-chilled or frozen raw meat products, such as a veal roll, are introduced to the solution, and as many coatings as necessary are applied to provide a thickness required on the finished product, due to the property of the solution of congealing very rapidly on hard-chilled products. Preferably, the temperature of the solution or emulsion at the time of application ranges from about 110° to 160° F. Due to the low surface temperature of the pre-chilled roll, the solidification of the solution is very rapid, and a second coating can be applied very shortly after the first.

From an appearance standpoint, the rolls produced by our process are more attractive and possess several outstanding advantages over rolls wrapped in beef caul fat. Among such advantages are the uniformity of the thickness of the fat covering, the manner in which it adheres to the roll after it becomes soft, and the improved appearance the roll possesses when cooked.

If desired the coating material may be colored any color desired by adding a suitable coloring agent. We have found that vegetable, edible color materials, such as a butter coloring material is an example of a suitable coloring agent.

Also, if desired, an antioxidant may be incorporated in the coating material. Meat products coated with gelatin coatings containing fatty materials and placed in freezer storage show less tendency to oxidative rancidity in the fat of the coating when an antioxidant is included in the protective coating. A suitable antioxidant for this purpose is gum guaiac.

Although the invention is not restricted to any particular theory and although the nature of the reaction of the anti-sticking agent is not fully understood, it is believed that the anti-sticking agent prevents the gelatin from charring and sticking to the pan during cooking, and that the fat functions largely as a medium for the anti-sticking agent. Accordingly, we do not intend that the invention is to be confined to the use of the anti-sticking agent in connection with both fat and gelatin, but in the broader aspects the invention contemplates the use of the anti-sticking agent in combination with gelatin in any environment where the charring and sticking problem of the gelatin in the presence of heat is encountered.

Obviously, many modifications and variations of the invention hereinbefore set forth may be made without departing from the spirit and scope thereof, and, therefore, only such limitations should be imposed as are indicated in the appended claims.

We claim:

1. A coating composition for meat comprising a base medium, a gelatin phase distributed throughout the medium, and a flour made from a vegetable seed, the flour serving as an anti-sticking agent and being present in sufficient amount to prevent the formation of a tacky mass of carbonized gelatin during cooking of the meat.

2. The composition as defined in claim 1, wherein the anti-sticking agent comprises a wheat flour.

3. The composition as defined in claim 1, wherein the anti-sticking agent comprises a wheat gluten flour.

4. The composition as defined in claim 1, wherein the anti-sticking agent comprises a soybean protein in flour form.

5. A coating composition for meat comprising: an emulsion containing approximately equal parts of oleo stock and a gelatin solution containing between approximately 3 to 20 per cent gelatin; and between approximately 4 to 8 per cent of a flour made from a vegetable seed intimately mixed therewith, the said flour serving as an anti-sticking agent for the emulsion to prevent the formation of a tacky mass of carbonized gelatin during the cooking of the meat.

6. A coating composition as described in claim 5 wherein the anti-sticking agent comprises wheat flour.

7. A coating composition as described in claim 5 wherein the anti-sticking agent comprises wheat gluten flour.

8. A coating composition as described in claim 5 wherein the anti-sticking agent comprises soybean protein in flour form.

HAROLD S. MITCHELL.
LORENZ E. KAY.
ANDREW S. HARTANOV.
JOHN M. RAMSBOTTOM.

REFERENCES CITED

The following references are of record in the file of this patent:

UNITED STATES PATENTS

| Number | Name | Date |
| --- | --- | --- |
| 2,029,248 | Musher | Jan. 28, 1936 |
| 2,057,695 | Schwieger | Oct. 20, 1936 |
| 2,113,216 | Mitchell | Apr. 5, 1938 |
| 2,150,732 | Thurman | Mar. 14, 1939 |
| 2,201,064 | Thurman | May 14, 1940 |
| 2,280,427 | Thurman | Apr. 21, 1942 |
| 2,329,472 | Koonz | Sept. 14, 1943 |
| 2,334,401 | Fitzpatrick | Nov. 16, 1943 |

OTHER REFERENCES

Horvath, The Soybean Industry, page 134, Chemical Publishing Co., N. Y. C., 1938. (Copy in Div. 63.)